(12) United States Patent
Dash et al.

(10) Patent No.: US 10,757,590 B2
(45) Date of Patent: Aug. 25, 2020

(54) USER EQUIPMENT (UE) AND METHODS FOR REGISTRATION OF CIRCUIT-SWITCHED (CS) SERVICES IN MULTI-MODE OPERATION

(71) Applicant: Intel IP Corporation, Santa Clara, CA (US)

(72) Inventors: Deepak Dash, Khordha (IN); Nitin Gowda Basavarajappa, Santa Clara, CA (US); Anuroop Sobhan Madupu, Bangalore (IN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/765,329

(22) PCT Filed: Mar. 9, 2016

(86) PCT No.: PCT/US2016/021489
§ 371 (c)(1),
(2) Date: Apr. 2, 2018

(87) PCT Pub. No.: WO2017/058281
PCT Pub. Date: Apr. 6, 2017

(65) Prior Publication Data
US 2018/0310190 A1 Oct. 25, 2018

Related U.S. Application Data

(60) Provisional application No. 62/236,725, filed on Oct. 2, 2015.

(51) Int. Cl.
*H04W 24/04* (2009.01)
*H04W 76/10* (2018.01)
(Continued)

(52) U.S. Cl.
CPC ....... *H04W 24/04* (2013.01); *H04W 36/0022* (2013.01); *H04W 48/18* (2013.01);
(Continued)

(58) Field of Classification Search
CPC . H04W 24/04; H04W 36/0022; H04W 48/18; H04W 60/04; H04W 76/10; H04W 84/045
See application file for complete search history.

(56) References Cited

U.S. PATENT DOCUMENTS

2011/0103277 A1* 5/2011 Watfa ................ H04W 36/0022
370/310
2014/0011519 A1* 1/2014 Lee ........................ H04W 8/24
455/456.1
(Continued)

FOREIGN PATENT DOCUMENTS

CN 107925979 4/2018
WO WO-2010022652 A1 3/2010
WO WO-2015065619 A1 5/2015

OTHER PUBLICATIONS

"European Application Serial No. 16852213.4, Invitation Pursuant to Rule 63(1) EPC dated Feb. 27, 2019", 4 pgs.
(Continued)

*Primary Examiner* — Un C Cho
*Assistant Examiner* — Peter K Mak
(74) *Attorney, Agent, or Firm* — Kowert, Hood, Munyon, Rankin & Goetzel, P.C.

(57) ABSTRACT

Embodiments of a User Equipment (UE) and methods for communication in multi-mode environments are generally described herein. The UE may operate in a failure state as part of a packet-switched (PS) communication session with a PS network, such as a 3GPP LTE network. The UE may determine that a circuit-switched (CS) communication session with a CS network is to be established. The UE may
(Continued)

transmit, while operating in the failure state of the PS communication session, a CS registration message to a CS base station of the CS network as part of an establishment of the CS communication session. The UE may refrain from transmission, while operating in the failure state, of messages to the PS network for the establishment of the CS communication session.

13 Claims, 10 Drawing Sheets

(51) Int. Cl.

| | | |
|---|---|---|
| *H04W 48/18* | (2009.01) | |
| *H04W 84/04* | (2009.01) | |
| *H04W 36/00* | (2009.01) | |
| *H04W 76/16* | (2018.01) | |
| *H04W 60/04* | (2009.01) | |
| *H04W 76/19* | (2018.01) | |

(52) U.S. Cl.
CPC ........... *H04W 60/04* (2013.01); *H04W 76/10* (2018.02); *H04W 76/16* (2018.02); *H04W 84/045* (2013.01); *H04W 76/19* (2018.02)

(56) References Cited

U.S. PATENT DOCUMENTS

| | | | | |
|---|---|---|---|---|
| 2014/0016614 A1* | 1/2014 | Velev | ................ | H04W 36/165 370/331 |
| 2014/0105028 A1* | 4/2014 | Bhaskaran | ........ | H04W 56/0035 370/242 |
| 2014/0153408 A1* | 6/2014 | Jun | .................... | H04L 65/1066 370/250 |
| 2014/0198722 A1 | 7/2014 | Cheng et al. | | |
| 2014/0241172 A1 | 8/2014 | Shukla et al. | | |
| 2015/0140998 A1 | 5/2015 | Kim et al. | | |
| 2017/0006034 A1* | 1/2017 | Link, II | .............. | H04L 61/2589 |

OTHER PUBLICATIONS

"European Application Serial No. 16852213.4, Extended European Search Report dated May 27, 2019", 10 pgs.

"International Application Serial No. PCT/US2016/021489, International Search Report dated Jul. 6, 2016", 9 pgs.

"International Application Serial No. PCT/US2016/021489, Written Opinion dated Jul. 6, 2016", 9 pgs.

"International Application Serial No. PCT US2016 021489, International Preliminary Report on Patentability dated Apr. 12, 2018", 9 pgs.

"European Application Serial No. 16852213.4, Response filed Nov. 8, 2018 to Communication pursuant to Rules 161(2) and 162 EPC dated May 9, 2018", 15 pgs.

* cited by examiner

USER EQUIPMENT (UE) AND METHODS FOR REGISTRATION OF CIRCUIT-SWITCHED (CS) SERVICES IN MULTI-MODE OPERATION

PRIORITY CLAIM

This application is a U.S. National Stage Filing under 35 U.S.C. 371 from International Application No. PCT/US2016/021489, filed Mar. 9, 2016 and published in English as WO 2017/058281 on Apr. 6, 2017, which claims the benefit of priority to U.S. Provisional Patent Application Ser. No. 62/236,725, filed Oct. 2, 2015, each of which is incorporated herein by reference in its entirety.

TECHNICAL FIELD

Embodiments pertain to wireless communications. Some embodiments relate to wireless networks including 3GPP (Third Generation Partnership Project) networks. 3GPP LTE (Long Term Evolution) networks, and 3GPP LTE-A (LTE Advanced) networks, although the scope of the embodiments is not limited in this respect. Some embodiments relate to packet-switched (PS) networks. Some embodiments relate to circuit-switched (CS) networks. Some embodiments relate to mobile devices that support operation in PS networks and/or CS networks.

BACKGROUND

A mobile network may support communication with mobile devices. In some cases, a mobile device may experience degradation in performance for any number of reasons. As an example, the mobile device may be out of coverage of base stations in the network. As another example, the network may experience congestion or other issues. In these and other scenarios, a performance of the device and/or a user experience may suffer. Accordingly, there is a general need for methods and systems for improving performance in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
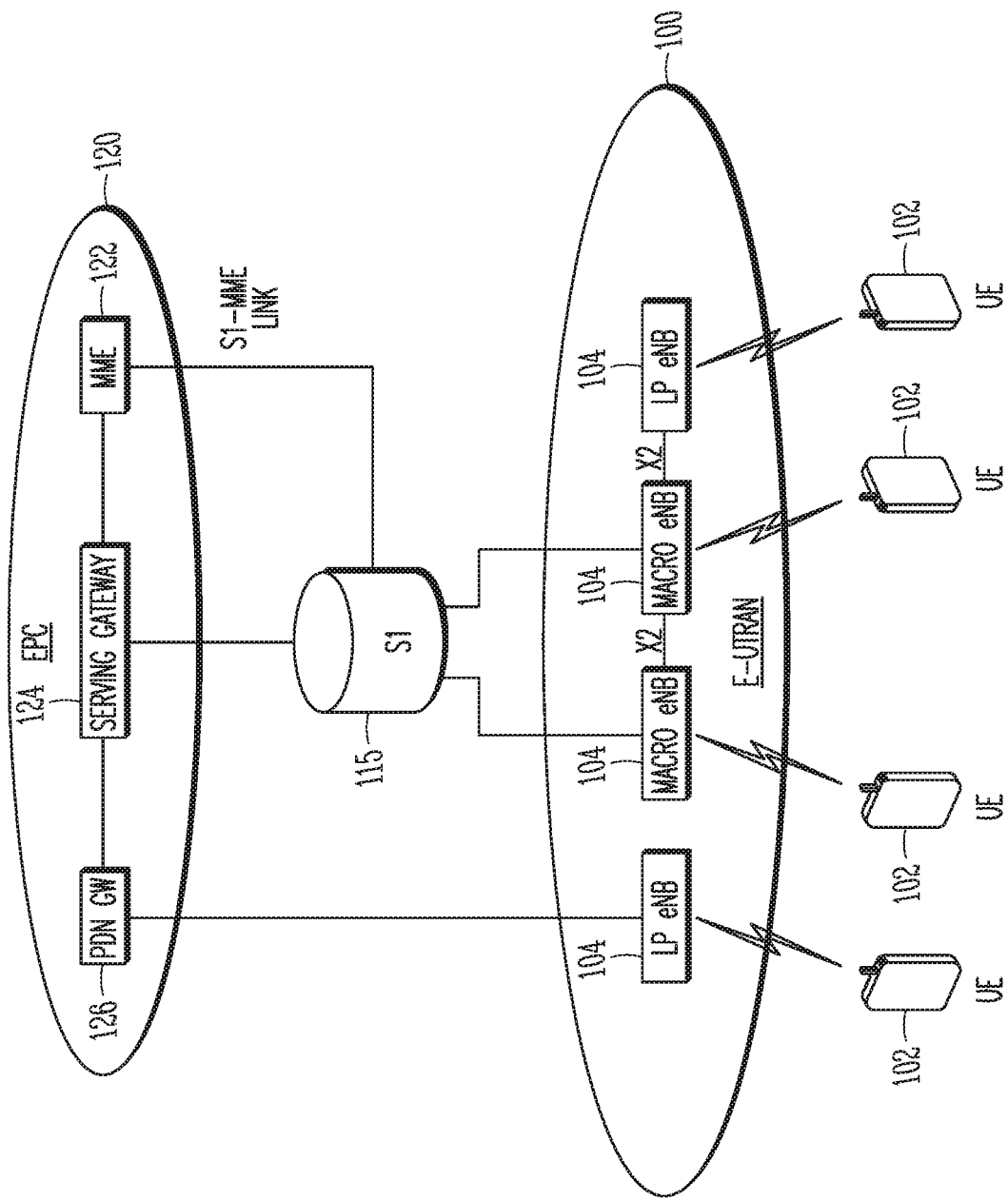
FIG. 1 is a functional diagram of a 3GPP network in accordance with some embodiments.

FIG. 1 is a functional diagram of a 3GPP network in accordance with some embodiments. It should be noted that embodiments are not limited to the example 3GPP network shown in FIG. 1, as other networks may be used in some embodiments. Such networks may or may not include some or all of the components shown in FIG. 1, and may include additional components and/or alternative components in some cases.

The network comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes a mobility management entity (MME) 122, a serving gateway (serving GW) 124, and packet data network gateway (PDN GW) 126. The RAN 100 includes Evolved Node-B's (eNBs) 104 (which may operate as base stations) for communicating with User Equipment (UE) 102. The eNBs 104 may include macro eNBs and low power (LP) eNBs.

In some embodiments, the UE 102 may exchange data signals, control signals and/or other signals with the eNB 104. The signals may be exchanged, in some embodiments, according to one or more packet-switched (PS) techniques, including but not limited to Evolved Packet System (EPS) techniques. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate Orthogonal Frequency Division Multiplexing (OFDM) communication signals with an eNB 104 over a multicarrier communication channel in accordance with an Orthogonal Frequency Division Multiple Access (OFDMA) communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operators mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). Each resource grid comprises a number of resource blocks (RBs), which describe the mapping of certain physical channels to resource elements. Each resource block comprises a collection of resource elements in the frequency domain and may represent the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and hybrid automatic repeat request (HARQ) information related to the uplink shared channel, Typically, downlink scheduling (e.g., assigning control and shared channel resource blocks to UEs 102 within a cell) may be performed at the eNB 104 based on channel quality information fed back from the UEs 102 to the eNB 104, and then the downlink resource assignment information may be sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
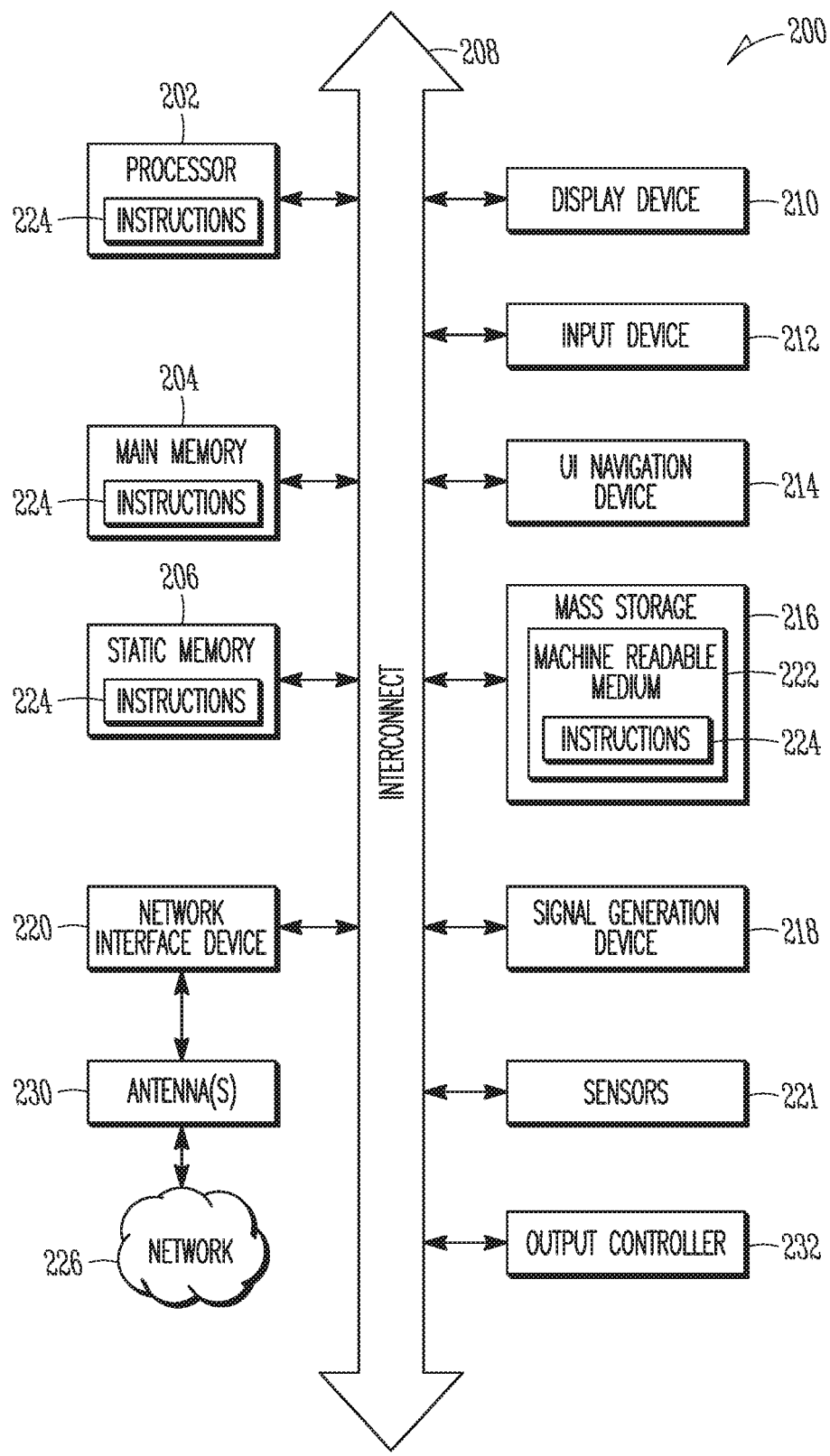
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be a UE 102, eNB 104, access point (AP), station (STA), mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NIT), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
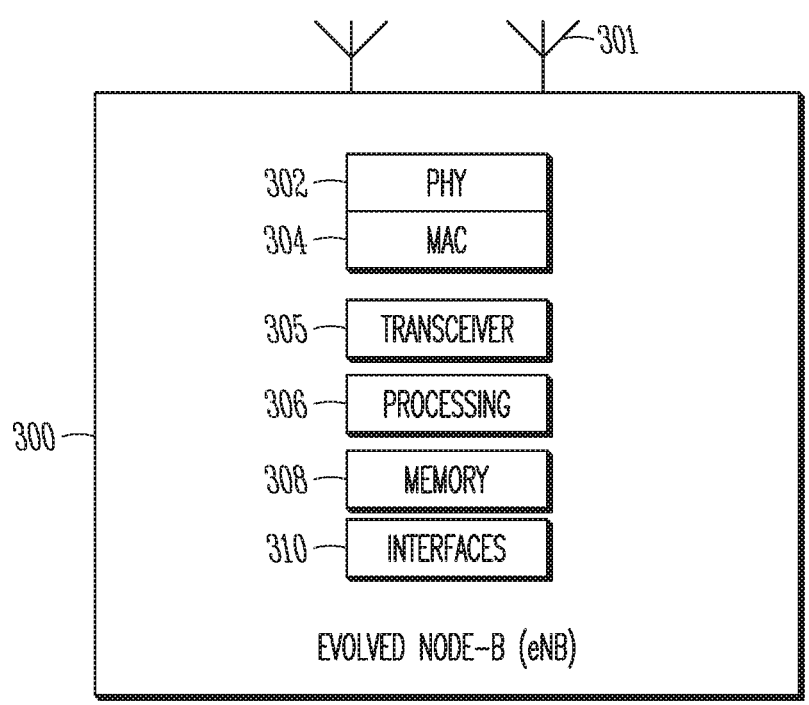
FIG. 3 is a block diagram of an Evolved Node-B (eNB) in accordance with some embodiments.

FIG. 3 is a block diagram of an Evolved Node-B (eNB) in accordance with some embodiments. It should be noted that in some embodiments, the eNB 300 may be a stationary non-mobile device. The eNB 300 may be suitable for use as an eNB 104 as depicted in FIG. 1. The eNB 300 may include physical layer circuitry 302 and a transceiver 305, one or both of which may enable transmission and reception of signals to and from the UE 200, other eNBs, other UEs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The eNB 300 may also include medium access control layer (MAC) circuitry 304 for controlling access to the wireless medium. The eNB 300 may also include processing circuitry 306 and memory 308 arranged to perform the operations described herein. The eNB 300 may also include one or more interfaces 310, which may enable communication with other components, including other eNBs 104 (FIG. 1), components in the EPC 120 (FIG. 1) or other network components. In addition, the interfaces 310 may enable communication with other components that may not be shown in FIG. 1, including components external to the network. The interfaces 310 may be wired or wireless or a combination thereof. It should be noted that in some embodiments, an eNB or other base station may include some or all of the components shown in either FIG. 2 or FIG. 3 or both.

Figure 4:
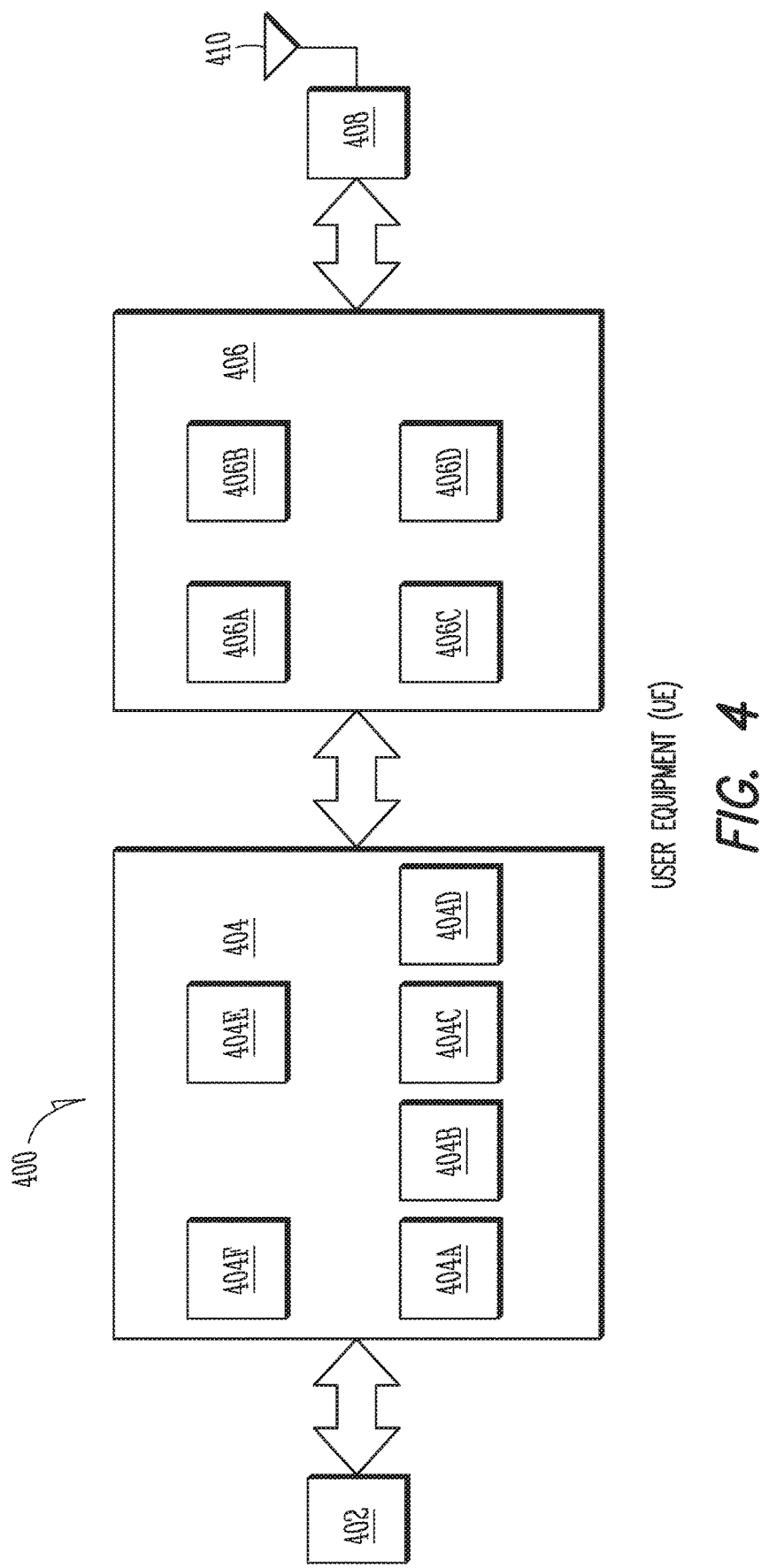
FIG. 4 is a block diagram of a User Equipment (UE) in accordance with some embodiments.

FIG. 4 is a block diagram of a User Equipment (UE) in accordance with some embodiments. The UE 400 may be suitable for use as a UE 102 as depicted in FIG. 1. In some embodiments, the UE 400 may include application circuitry 402, baseband circuitry 404, Radio Frequency (RF) circuitry 406, front-end module (FEM) circuitry 408 and one or more antennas 410, coupled together at least as shown. In some embodiments, other circuitry or arrangements may include one or more elements and/or components of the application circuitry 402, the baseband circuitry 404, the RF circuitry 406 and/or the FEM circuitry 408, and may also include other elements and/or components in some cases. As an example, "processing circuitry" may include one or more elements and/or components, some or all of which may be included in the application circuitry 402 and/or the baseband circuitry 404. As another example, "transceiver circuitry" may include one or more elements and/or components, some or all of which may be included in the RF circuitry 406 and/or the FEM circuitry 408. These examples are not limiting, however, as the processing circuitry and/or the transceiver circuitry may also include other elements and/or components in some cases. It should be noted that in some embodiments, a UE or other mobile device may include some or all of the components shown in either FIG. 2 or FIG. 4 or both.

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 404 may include circuitry such as, but not limited to, one or more single-core or multi-core processors. The baseband circuitry 404 may include one or more baseband processors and/or control logic to process baseband signals received from a receive signal path of the RF circuitry 406 and to generate baseband signals for a transmit signal path of the RF circuitry 406. Baseband processing circuitry 404 may interface with the application circuitry 402 for generation and processing of the baseband signals and for controlling operations of the RF circuitry 406. For example, in some embodiments, the baseband circuitry 404 may include a second generation (2G) baseband processor 404a, third generation (3G) baseband processor 404b, fourth generation (4G) haseband processor 404c, and/or other baseband processor(s) 404d for other existing generations, generations in development or to be developed in the future (e.g., fifth generation (5G), 6G, etc.). The baseband circuitry 404 (e.g., one or more of baseband processors 404a-d) may handle various radio control functions that enable communication with one or more radio networks via the RF circuitry 406. The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, and/or constellation mapping/demapping functionality. In some embodiments, encoding/decoding circuitry of the baseband circuitry 404 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include elements of a protocol stack such as, for example, elements of an evolved universal terrestrial radio access network (EUTRAN) protocol including, for example, physical (PRY), media access control (MAC), radio link control (RLC), packet data convergence protocol (PDCP), and/or radio resource control (RRC) elements. A central processing unit (CPU) 404e of the baseband circuitry 404 may be configured to run elements of the protocol stack for signaling of the PRY, MAC, RLC, PDCP and/or RRC layers. In some embodiments, the baseband circuitry may include one or more audio digital signal processor(s) (DSP) 404f. The audio DSP(s) 404f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (EUTRAN) and/or other wireless metropolitan area networks (LAYMAN), a wireless local area network (ULAN), a wireless personal area network (WPAN). Embodiments in which the baseband circuitry 404 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path which may include circuitry to down-convert RF signals received from the FEM circuitry 408 and provide baseband signals to the baseband circuitry 404. RE circuitry 406 may also include a transmit signal path which may include circuitry to up-convert baseband signals provided by the baseband circuitry 404 and provide RF output signals to the FEM circuitry 408 for transmission.

In some embodiments, the RF circuitry 406 may include a receive signal path and a transmit signal path. The receive signal path of the RF circuitry 406 may include mixer circuitry 406a, amplifier circuitry 406b and filter circuitry 406c. The transmit signal path of the RF circuitry 406 may include filter circuitry 406c and mixer circuitry 406a. RF circuitry 406 may also include synthesizer circuitry 406d for synthesizing a frequency for use by the mixer circuitry 406a of the receive signal path and the transmit signal path. In some embodiments, the mixer circuitry 406a of the receive signal path may be configured to down-convert RF signals received from the FEM circuitry 408 based on the synthesized frequency provided by synthesizer circuitry 406d. The amplifier circuitry 406b may be configured to amplify the down-converted signals and the filter circuitry 406c may be a low-pass filter (LPF) or band-pass filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, mixer circuitry 406a of the receive signal path may comprise passive mixers, although the scope of the embodiments is not limited in this respect. In some embodiments, the mixer circuitry 406a of the transmit signal path may be configured to up-convert input baseband signals based on the synthesized frequency provided by the synthesizer circuitry 406d to generate RF output signals for the FEM circuitry 408. The baseband signals may be provided by the baseband circuitry 404 and may be filtered by filter circuitry 406c. The filter circuitry 406c may include a low-pass filter (LPF), although the scope of the embodiments is not limited in this respect.

In some embodiments, the mixer circuitry 406a of the receive signal path and the mixer circuitry 406a of the transmit signal path may include two or more mixers and may be arranged for quadrature downconversion and/or upconversion respectively. In some embodiments, the mixer circuitry 406a of the receive signal path and the mixer circuitry 406a of the transmit signal path may include two or more mixers and may be arranged for image rejection (e.g., Hartley image rejection). In some embodiments, the mixer circuitry 406a of the receive signal path and the mixer circuitry 406a may be arranged for direct downconversion and/or direct upconversion, respectively. In some embodiments, the mixer circuitry 406a of the receive signal path and the mixer circuitry 406a of the transmit signal path may be configured for super-heterodyne operation, In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 404 may include a digital baseband interface to communicate with the RF circuitry 406. In some dual-mode embodiments, a separate radio IC circuitry may be provided for processing signals for each spectrum, although the scope of the embodiments is not limited in this respect.

In some embodiments, the synthesizer circuitry 406d may be a fractional-N synthesizer or a fractional N,N+1 synthesizer, although the scope of the embodiments is not limited in this respect as other types of frequency synthesizers may be suitable. For example, synthesizer circuitry 406d may be a delta-sigma synthesizer, a frequency multiplier, or a synthesizer comprising a phase-locked loop with a frequency divider. The synthesizer circuitry 406d may be configured to synthesize an output frequency for use by the mixer circuitry 406a of the RF circuitry 406 based on a frequency input and a divider control input. In some embodiments, the synthesizer circuitry 406d may be a fractional N/N+1 synthesizer. In some embodiments, frequency input may be provided by a voltage controlled oscillator (VCO), although that is not a requirement. Divider control input may be provided by either the baseband circuitry 404 or the applications processor 402 depending on the desired output frequency. In some embodiments, a divider control input (e.g., N) may be determined from a look-up table based on a channel indicated by the applications processor 402.

Synthesizer circuitry 406d of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one WO cycle.

In some embodiments, synthesizer circuitry 406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 406 may include an IQ/polar converter.

FEM circuitry 408 may include a receive signal path which may include circuitry configured to operate on RF signals received from one or more antennas 410, amplify the received signals and provide the amplified versions of the received signals to the RF circuitry 406 for further processing. FEM circuitry 408 may also include a transmit signal path which may include circuitry configured to amplify signals for transmission provided by the RF circuitry 406 for transmission by one or more of the one or more antennas 410.

In some embodiments, the FEM circuitry 408 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 406). The transmit signal path of the FEM circuitry 408 may include a power amplifier (PA) to amplify input RF signals (e.g., provided by RF circuitry 406), and one or more filters to generate RF signals for subsequent transmission (e.g., by one or more of the one or more antennas 410. In some embodiments, the UE 400 may include additional elements such as, for example, memory/storage, display, camera, sensor, and/or input/output (I/O) interface.

The antennas 230, 301, 410 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 230, 301, 410 may be effectively separated to take advantage of spatial diversity and the different channel characteristics that may result.

In some embodiments, the UE 400 and/or the eNB 300 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 400 or eNB 300 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 400, eNB 300 or other device may include one or more of a keyboard, a display, a non-volatile memory port, multiple antennas, a graphics processor, an application processor, speakers, and other mobile device elements. The display may be an LCD screen including a touch screen.

Although the UE 400 and the eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 400 and/or eNB 300 and/or machine 200 may include various components of the UE 200 and/or the eNB 300 and/or the machine 200 as shown in FIGS. 2-4. Accordingly, techniques and operations described herein that refer to the UE 400 (or 102) may be applicable to an apparatus for a UE. In addition, techniques and operations described herein that refer to the eNB 300 (or 104) may be applicable to an apparatus for an eNB.

In accordance with some embodiments, the UE 102 may operate in a failure state as part of a packet-switched (PS) communication session with a PS network, such as a 3GPP LTE network. The UE may determine that a circuit-switched (CS) communication session with a CS network is to be established. The UE may transmit, while operating in the failure state of the PS communication session, a CS registration message to a CS base station of the CS network as part of an establishment of the CS communication session. The UE may refrain from transmission, while operating in the failure state, of messages to the PS network for the establishment of the CS communication session. These embodiments are described in more detail below.

Figure 5:
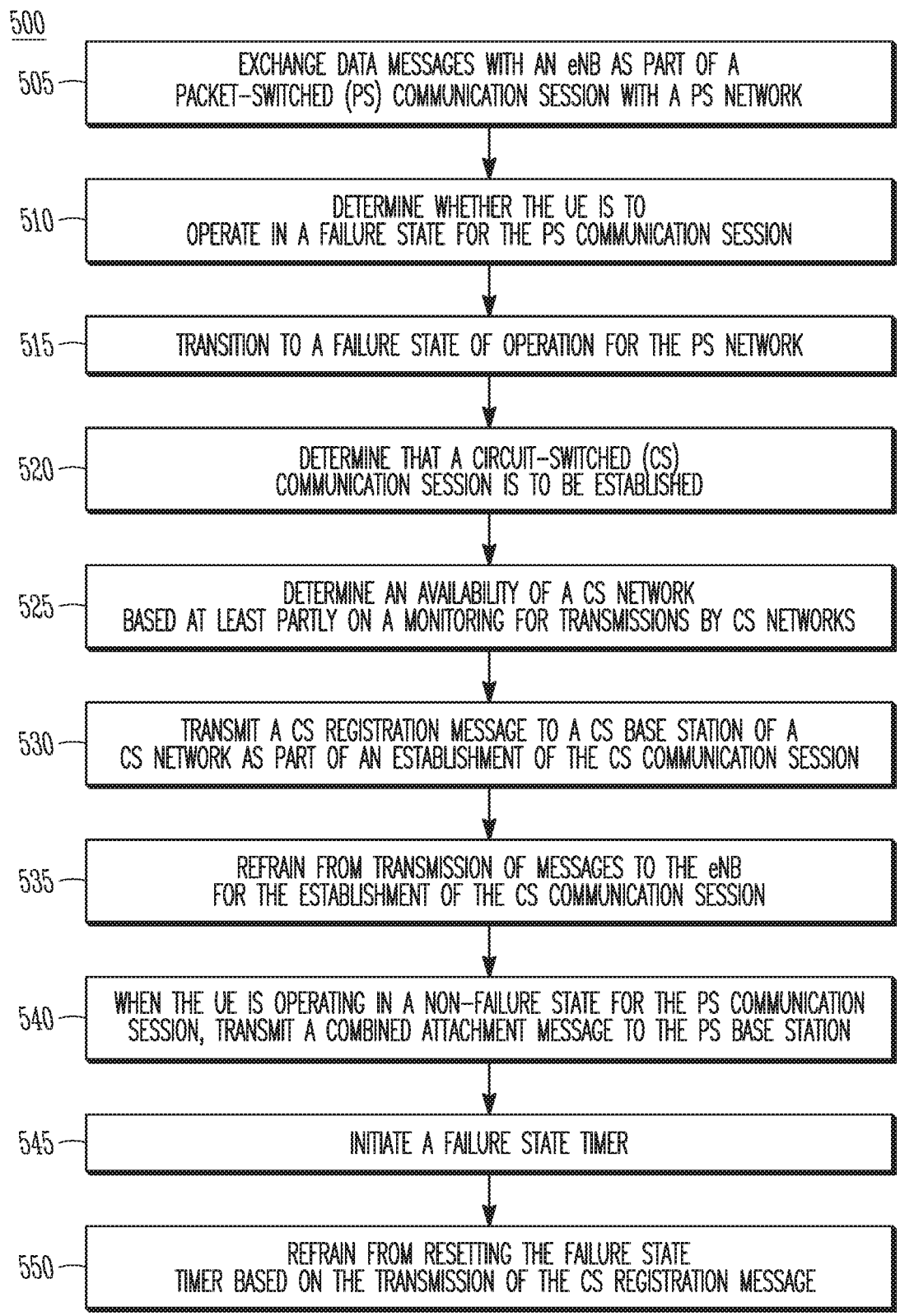
FIG. 5 illustrates the operation of a method of communication in accordance with some embodiments.

FIG. 5 illustrates the operation of a method of communication in accordance with some embodiments. It is important to note that embodiments of the method 500 may include additional or even fewer operations or processes in comparison to what is illustrated in FIG. 5. In addition, embodiments of the method 500 are not necessarily limited to the chronological order that is shown in FIG. 5. In describing the method 500, reference may be made to FIGS. 1-4 and 6-10, although it is understood that the method 500 may be practiced with any other suitable systems, interfaces and components.

In addition, while the method 500 and other methods described herein may refer to eNBs 104 or UEs 102 operating in accordance with 3GPP standards, 2G standards and/or other standards, embodiments of those methods are not limited to just those eNBs 104 or UEs 102 and may also be practiced on other devices, such as a Wi-Fi, access point (AP) or user station (STA). In addition, the method 500 and other methods described herein may be practiced by wireless devices configured to operate in other suitable types of wireless communication systems, including systems configured to operate according to various IEEE standards such as IEEE 802.11. The method 500 may also refer to an apparatus for a UE 102 and/or eNB 104 and/or other device described above.

At operation 505 of the method 500, the UE 102 may exchange data messages with an eNB 104 as part of a packet-switched (PS) communication session with a PS network. As a non-limiting example, the PS network may be and/or may include a 3GPP LTE network and the data messages may be transmitted and/or received over a wireless link. As another non-limiting example, the PS network may support a packet service such as Evolved Packet Service (EPS) and the PS communication session may include an EPS communication session. These examples are not limiting, however, as other suitable PS networks and/or packet services may be used, which may or may not be part of a standard. In addition, the UE 102 and the eNB 104 may also exchange (transmit and/or receive) control messages and or other messages as part of the PS network.

At operation 510, the UE 102 may determine whether the UE 102 is to operate in a failure state for the PS communication session. In some embodiments, the UE 102 may determine whether the UE 102 is to operate in the failure state or in a normal state (which may be a non-failure state, in some cases). At operation 515, the UE 102 may transition to the failure state.

As an example, it may be determined whether the UE 102 is to operate in the failure state and/or normal state based at least partly on a network condition of the PS network, such as network congestion and/or other condition. As another example, it may be determined that the UE 102 is to operate in the failure state and/or normal state based at least partly on issues related to an air interface between the UE 102 and the eNB 104, network coverage of the UE 102 and/or other performance measurement related to a wireless link between the UE 102 and the eNB 104. As another example, it may be determined that the UE 102 is to operate in the failure state and/or normal state based at least partly on a network failure between the UE 102 and the network related to a failed registration attempt with the network. These examples are not limiting, however, as other factors may be used to determine whether the UE 102 is to operate in the failure state and/or normal state.

As a non-limiting example, in a first failure state, the UE 102 may be de-registered from the PS network and may intend to attach to the PS network. For instance, a DEREGISTERED.ATTEMPTING-TO-ATTACH state, which may be included in a 3GPP standard, may be used in some cases. As another non-limiting example, in a second failure state, the UE 102 may be registered with the PS network and may intend to update information related to the PS communication session. For instance, a REGISTERED.ATTEMPTING-TO-UPDATE state, which may be included in a 3GPP standard, may be used in some cases. These examples are not limiting, however, as other failure states may be used, which may or may not be part of a 3GPP standard and/or other standard.

In some embodiments, a group of one or more possible failure states may be used. For instance, such a group may include neither, either or both of these example failure states, in some cases, and may include other failure states in some cases. These examples are not limiting, however, as other failure states may be used, which may or may not be part of a 3GPP standard and/or other standard.

At operation 520, the UE 102 may determine that a circuit-switched (CS) communication session is to be established. In some embodiments, it may be determined that the CS communication session is to be established with a CS network, which may or may not be exclusive to the PS network. As a non-limiting example, the determination that the CS communication session is to be established may be based at least partly on a service request generated, at the UE 102, by a connection management (CM) sub-layer of the UE 102. In some embodiments, the CS communication session may include a non-EPS communication session, although embodiments are not limited as such, and any suitable CS communication session may be used.

In some cases, the determination that the CS communication session is to be established may be performed while the UE 102 operates in the failure state. Various techniques that may be used as part of an establishment of the CS communication session in such scenarios are described herein.

At operation 525, the UE 102 may determine an availability of one or more CS networks. Non-limiting examples of such CS networks may include UNITS, GERAN and/or other CS network which may or may not operate in accordance with a standard. In some embodiments, the determination of the availability of the CS network(s) may be based at least partly on a monitoring for transmissions by CS networks. For instance, the UE 102 may monitor for such transmissions by attempting to receive a signal (such as a beacon signal or other) from a CS network. Accordingly, the UE 102 may attempt to detect a presence of one or more CS base stations based at least partly on a monitoring, by the UE 102, for CS network signals. In some embodiments, the UE 102 may attempt to determine an availability of at least one CS base station to support the CS communication session. In some cases, the UE 102 may not necessarily know which CS networks, if any, are operating within range of the UE 102 as part of operation 525.

At operation 530, the UE 102 may transmit a CS registration message to a CS base station of a CS network as part of an establishment of the CS communication session. In some embodiments, the UE 102 may transmit, when it is determined that a group of one or more CS base stations is available, a registration message for the CS connection to at least one of the CS base stations in the group. At operation 535, the UE 102 may refrain from transmission of messages to the eNB 104 for the establishment of the CS communication session. In some cases, the UE 102 may refrain from transmission of messages to the PS network for the establishment of the CS communication session.

Although embodiments are not limited as such, either or both of operations 530 and 535 may be performed while the UE 102 operates in the failure state. In some embodiments, operations 530 and 535 may be included as part of a procedure that may be performed when the UE 102 is operating in the failure state and determines that the CS communication session is to be established. In some embodiments, the UE 102 may, while the UE operates in the failure state and when it is determined that a group of one or more CS base stations is available, transmit a registration message for the CS connection to at least one of the CS base stations in the group and/or refrain from transmission to the eNB of registration messages for the CS connection.

At operation 540, the UE 102 may transmit, when the UE 102 is operating in a non-failure state for the PS communication session, a combined attachment message to the PS base station. In some embodiments, the combined attachment message may include status information for the PS communication session and may further include an indicator that the CS communication session is to be established. Accordingly, in some embodiments, operations performed by the UE 102 for the establishment of the CS communication session may depend on whether the UE 102 operates in the failure state or normal state (non-failure state). However, it should be noted that some embodiments of the method 500 may not include operation 540.

At operation 545, the UE 102 may initiate one or more failure state timers. At operation 550, the UE 102 may refrain from resetting the failure state timer(s) based on the transmission of the CS registration message. As a non-limiting example, timers related to a 3GPP standard, such as a T3411 timer, a T3402 timer and/or other timer, may be used.

In some embodiments, a UE 102 and/or other mobile device may operate in a failure state. In some cases, a non-access stratum (NAS) layer or NAS module of the UE 102 may operate in the failure state. Non-limiting examples of such failure states may include an "EMM-REGISTERED ATTEMPTING-TO-UPDATE" state (or similar state), a "REGISTERED.ATTEMPING-TO-UPDATE" state (or similar state), an "EMM-DEREGISTERED.ATTEMPTING-TO-ATTACH" state (or similar state), a "DEREGISTERED.ATTEMPTING-TO-ATTACH" state (or similar state) and/or other failure state. Although not limited as such, the failure state may be included in a. 3GPP standard and/or other standard. However, embodiments are not limited to usage of failure states that are included in a standard. The UE 102 may operate in the failure state for any suitable reason, including but not limited to temporary failures related to a network, registration, air interface and/or other aspect. It should also be noted that techniques and/or operations described herein may refer to one or more particular failure states (such as those above), but such references are not limiting. In some embodiments, such techniques and/or operations may be used in accordance with other failure states.

In some cases, the failure state may be related to operation of the UE 102 as part of a packet-switched (PS) network. As a non-limiting example, the UE 102 may be arranged to operate in a 3GPP LTE network. Accordingly, the PS network may support PS services such as an Evolved Packet System (EPS) service that may be included in a 3GPP standard and/or other standard. Embodiments are not limited to the EPS services, however, as other PS services that may or may not be included in a standard may be supported by the UE 102 in some embodiments.

In some embodiments, the UE 102 may support one or more circuit-switched (CS) services in addition to one or more PS services. Accordingly, the UE 102 may be and/or may be configured to operate as a multi-mode device in some cases. The CS services may include non-EPS services that may or may not be included in a standard such as a 3GPP standard and/or other standard.

In an example scenario, the UE 102 may receive a non-EPS service request. As a non-limiting example, a non-EPS service request may be received while the UE 102 operates in the failure state with respect to operation in the PS network. The UE 102 may operate in the failure state as a result of a failure related to an EPS service supported by the PS network, an air interface between the UE 102 and a base station of the PS network, a PS network issue and/or other failure. In some cases, the non-EPS service request may be received from and/or may be generated by a Connection Management (CM) sub-layer of the UE 102.

In this example scenario, if the UE 102 attempts to initiate a registration procedure with the PS network for the requested non-EPS service request, a probability of a successful registration may not be high (or sufficiently high) in some cases. For instance, an issue that may have caused the UE 102 to enter the failure state with respect to the PS network may persist, in some cases, and registration attempts for the non-EPS service request may also fail. Examples of such registration procedures with the PS network may include, but are not limited to, an attach procedure while the UE 102 operates in the DEREGISTERED.ATTEMPTING-TO-ATTACH state, a Tracking Area Update (TAU) procedure while the UE 102 operates in the REGISTERED.ATTEMPTING-TO-UPDATE state and/or other procedure. Accordingly, one or more registration failures of such a non-EPS service request with the PS network may cause a considerable amount of delay, in some cases. In addition, the approach of retrying a registration for the non-EPS service request while a failure state timer is running may cause network overloads, in some cases. For instance, multiple bursts of such registration requests may occur within a relatively short time span. The failure state timer may be a T3411 timer, a T3402 timer and/or other timer that may or may not be included in a 3GPP standard and/or other standard.

In some embodiments, the UE 102 may be arranged to operate in an LTE RAT (PS network) and a non-LTE RAT (CS network), although embodiments are not limited to usage of the LTE RAT and non-LTE RAT as the PS network and CS network, respectively. Accordingly, reference to the LTE RAT and non-LTE RAT in scenarios described herein are not limiting, as other suitable PS networks and/or CS networks may be used, in some embodiments.

In some embodiments, the UE 102 may refrain from proceeding with additional registration procedures in an LTE RAT when the UE 102 receives a non-EPS service request from the CM sub-layer while the UE 102 operates in a DEREGISTERED.ATTEMPTING-TO-ATTACH or a REGISTERED.ATTEMPTING-TO-UPDATE state. The UE 102 may proceed with selecting a suitable cell in a non-LTE RAT (such as a UMTS, GERAN and/or other) and may proceed with one or more 3GPP procedures for non-EPS service requests for the non-LTE RAT.

In some embodiments, the UE 102 may skip (and/or may refrain from) attempting to communicate with the LIE RAT, for processing the non-EPS service request, over an unstable LTE air interface or when an unstable LTE network condition may be present. In addition, the UE 102 may also attempt to communicate with the non-LTE network for processing of the non-EPS service request, in some embodiments. In some cases, one or more benefits may be realized in terms of performance measures such as probability of successfully communicating the non-EPS service request, time spent in attempting to register and/or re-register for the non-EPS service request and/or other performance measures.

In some embodiments, the UE 102 may be configured to not skip (and/or may refrain from skipping) timers such as T3411 and/or T3402. Accordingly, in some cases, the LIE network may be protected against a burst of registration requests that may be caused (at least partly) by the UE 102 skipping such timers. The UE 102 not skipping such timers may reduce and/or eliminate a misuse of skipping such timers, in some cases.

In some embodiments, instead of the UE 102 re-attempting registration and/or subsequent Circuit Switched Fallback (CSFB) operations on the currently un-favorable LTE RAT (a condition of which may have caused the UE 102 to operate in the DEREGISTERED.ATTEMPTING-TO-ATTACH state, REGISIERED.ATTEMPTING-TO-UPDATE state and/or other failure state) the UE 102 may directly select a suitable non-LTE RAT cell and may proceed with processing of a non-EPS request from the CM sub-layer.

In some embodiments, the UE 102 may be arranged to operate in accordance with one or more 3GPP standards. While operating in a DEREGISTERED.ATTEMPTING-TO-ATTACH state, the UE 102 may use requests for non-EPS services (such as requests from the CM layer and/or other requests) to trigger a combined attach procedure if the T3346 timer is not running or may use the requests for non-EPS services to attempt to select a GERAN or UTRAN RAT. If the UE 102 finds a suitable GERAN or UTRAN cell and a CS fallback cancellation request was not received, the UE 102 may then proceed with one or more appropriate Mobility Management (MM) and/or Call Control (CC) specific procedures. The EPS Mobility Management (EMM) sub-layer may not indicate (and/or may refrain from indicating) the abort of the service request procedure to the MM sub-layer.

In some embodiments, the UE 102 may be arranged to operate in accordance with one or more 3GPP standards. While operating in a DEREGISTERED.ATTEMPTING-TO-ATTACH state, the UE 102 may use requests for non-EPS services (such as requests from the CM layer and/or other requests) to attempt to select a GERAN or UTRAN radio access technology (RAT). If the UE 102 finds a suitable GERAN or UTRAN cell and a CS fallback cancellation request was not received, the UE 102 may then proceed with one or more appropriate MM and/or CC specific procedures. The EMM sub-layer may not indicate (and/or may refrain from indicating) the abort of the service request procedure to the MM sub-layer.

In some embodiments, the UE 102 may be arranged to operate in accordance with one or more 3GPP standards. While operating in a REGISTERED.ATTEMPTING-TO-UPDATE state, the UE 102 may use requests for non-EPS services (such as requests from the CM layer and/or other requests) to trigger a combined tracking area updating (TAU) procedure if the T3346 timer is not running or may use the requests for the non-EPS services to attempt to select a GERAN or UTRAN RAT. If the UE 102 finds a suitable GERAN or UTRAN cell and a CS fallback cancellation request was not received, the UE 102 may then proceed with one or more appropriate MM and/or CC specific procedures. The EMM sub-layer may not indicate (and/or may refrain from indicating) the abort of the service request procedure to the MM sub-layer.

In some embodiments, the UE 102 may be arranged to operate in accordance with one or more 3GPP standards. While operating in a REGISTERED.ATTEMPTING-TO-UPDATE state, the UE 102 may use requests for non-EPS services (such as requests from the CM layer and/or other requests) to attempt to select a GERAN or UTRAN RAT. If the UE 102 finds a suitable GERAN or UTRAN cell and a CS fallback cancellation request was not received, the UE 102 may then proceed with one or more appropriate MM and/or CC specific procedures. The EMM sub-layer may not indicate (and/or may refrain from indicating) the abort of the service request procedure to the MM sub-layer.

While in the ATTEMPTING-TO-ATTACH state, the UE may use requests for non-EPS services from CM layers to trigger a combined attach procedure, if timer T3346 is not running (see subclause 5.5.1.3) or to attempt to select GERAN or UTRAN radio access technology. If the UE finds a suitable GERAN or UTRAN cell and a CS Callback cancellation request was not received, it then proceeds with the appropriate MM and CC specific procedures. The EMM sublayer may not indicate the abort of the service request procedure to the MM sublayer; and may initiate an attach procedure upon request of the upper layers to establish a PDN connection for emergency bearer services, if timer T3346 is not running.

While in the ATTEMPTING-TO-UPDATE state, The UE may use requests for non-EPS services from CM layers to trigger a combined tracking area updating procedure, if timer T3346 is not running (see subclause 5.5.3.3) or to attempt to select GERAN or UTRAN radio access technology. If the UE finds a suitable GERAN or UTRAN cell and a CS Callback cancellation request was not received, it then proceeds with the appropriate MM and CC specific procedures. The EMM sublayer may not indicate the abort of the service request procedure to the MM sublayer; may initiate tracking area updating in response to paging, if timer T3346 is running; and may initiate tracking area updating if the EPS update status is set to EU2 NOT UPDATED, and timers T3411 and T3402 are not running.

Figure 6:
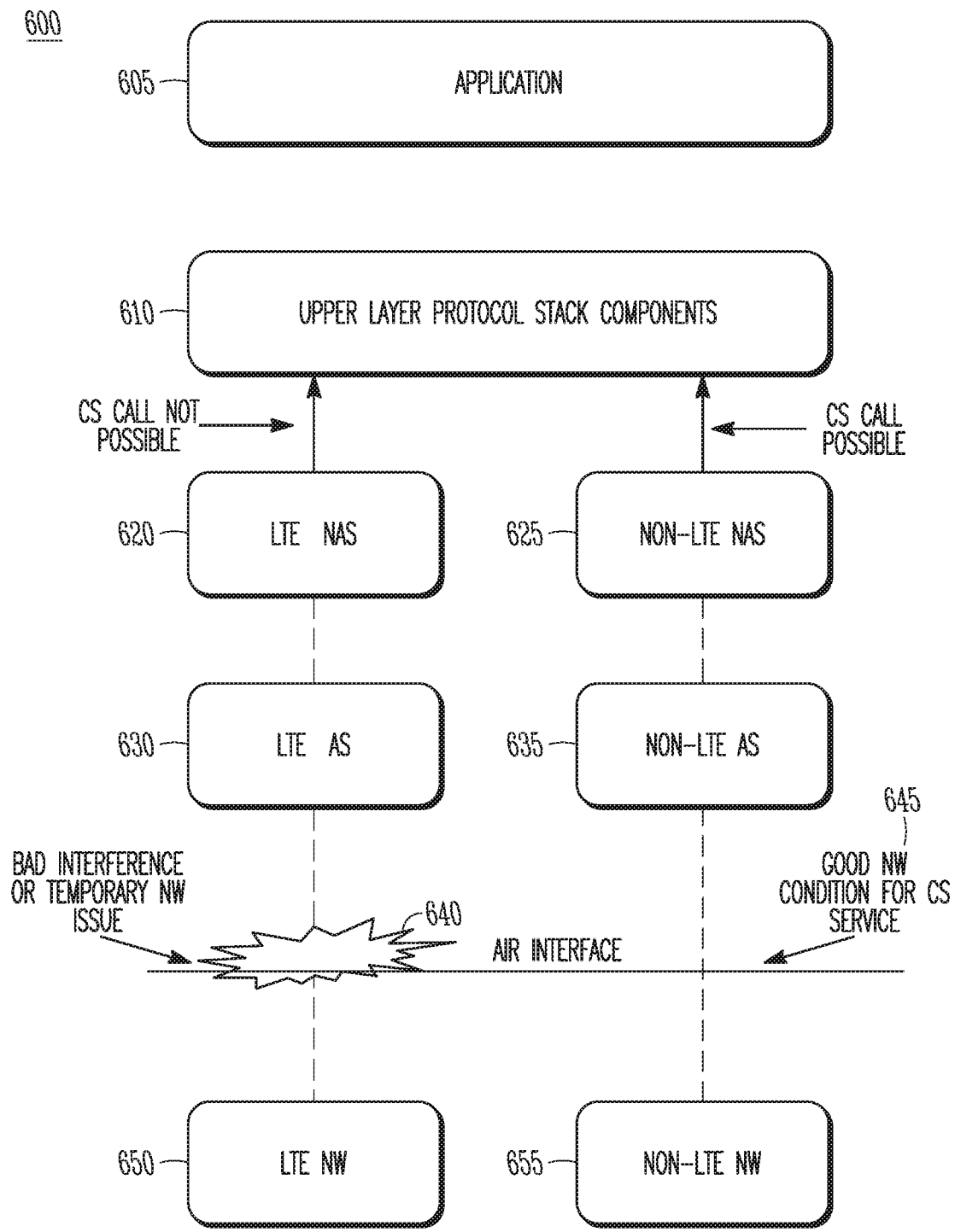
FIG. 6 illustrates an example of a failure condition for a Long Term Evolution (LTE) network in accordance with some embodiments.

FIG. 6 illustrates an example of a failure condition for a Long Term Evolution (LTE) network in accordance with some embodiments. Although the example failure condition 600 may illustrate some or all techniques, operations and/or concepts described herein, it is understood that embodiments are not limited by the example 600 in terms of number, type, size, arrangement and/or other aspects of elements shown in FIGS. 6-7. Such elements include, but are not limited to protocol layers, protocol modules, networks to which the UE 102 may communicate and/or others.

Referring to FIG. 6, the UE 102 may be arranged to operate in an LTE network and in a non-LTE network. Embodiments are not limited to the LTE network and non-LTE network, however, as other suitable PS networks and/or CS networks may be used in some embodiments.

As shown at 640, an issue such as interference on the air interface, a temporary network issue and/or other issue may cause the CS call to be impossible on the LTE network. However, it may be possible that due to conditions for the non-LTE network, as shown by 645, the CS call may be possible on the non-LTE network.

Figure 7:
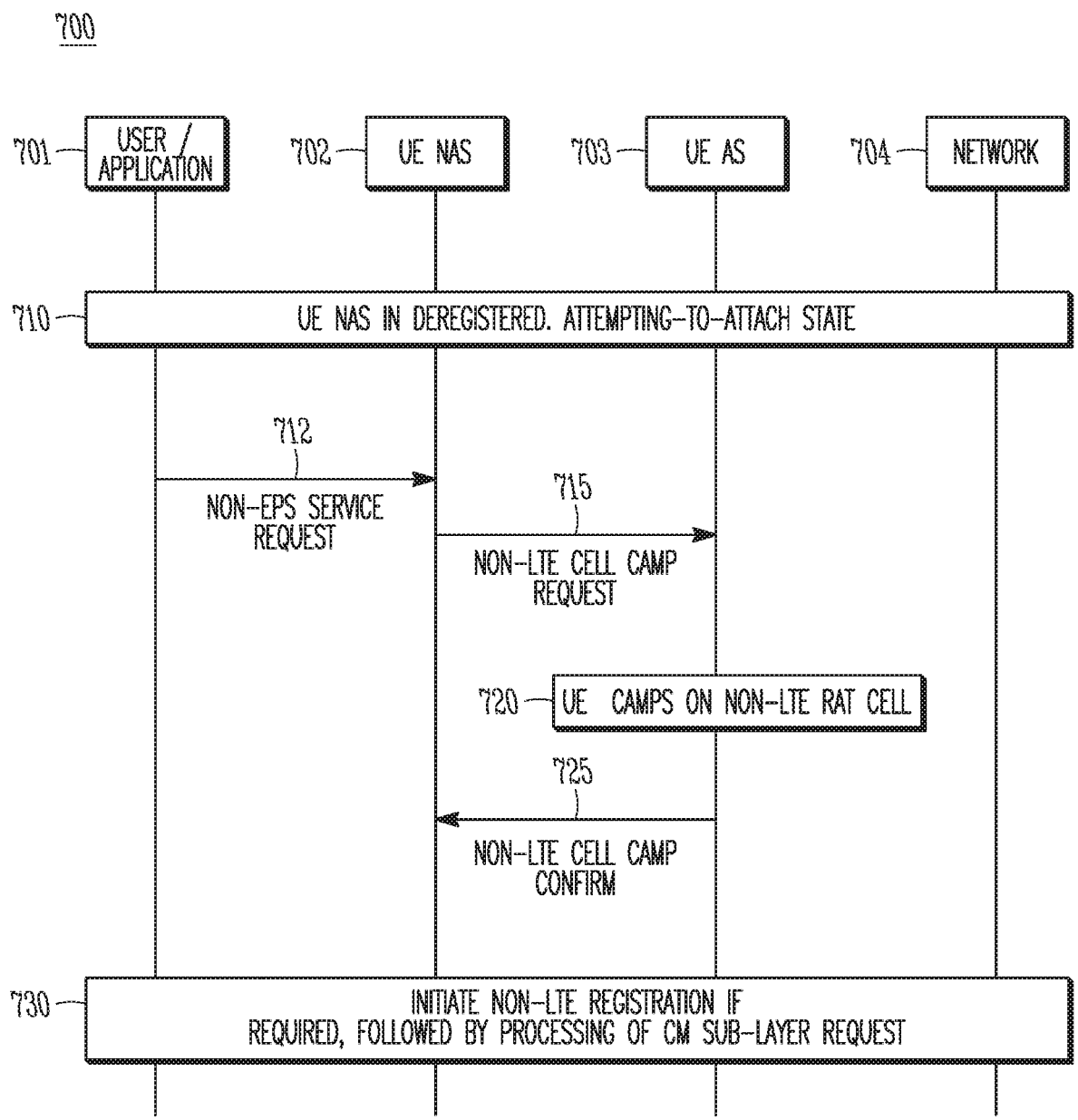
FIG. 7 illustrates an example of a network failure scenario in accordance with some embodiments.
Figure 8:
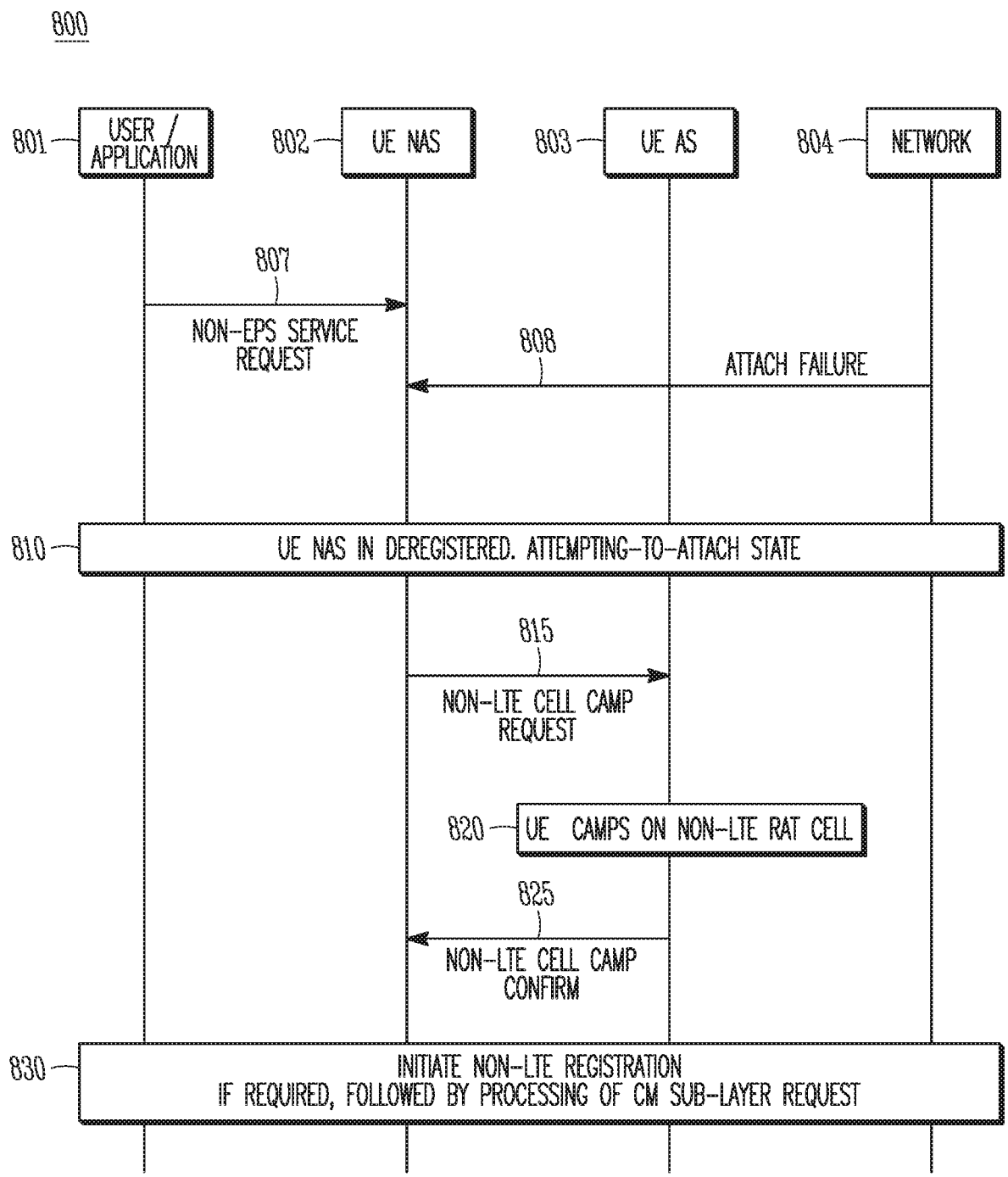
FIG. 8 illustrates another example of a network failure scenario in accordance with some embodiments.
Figure 9:
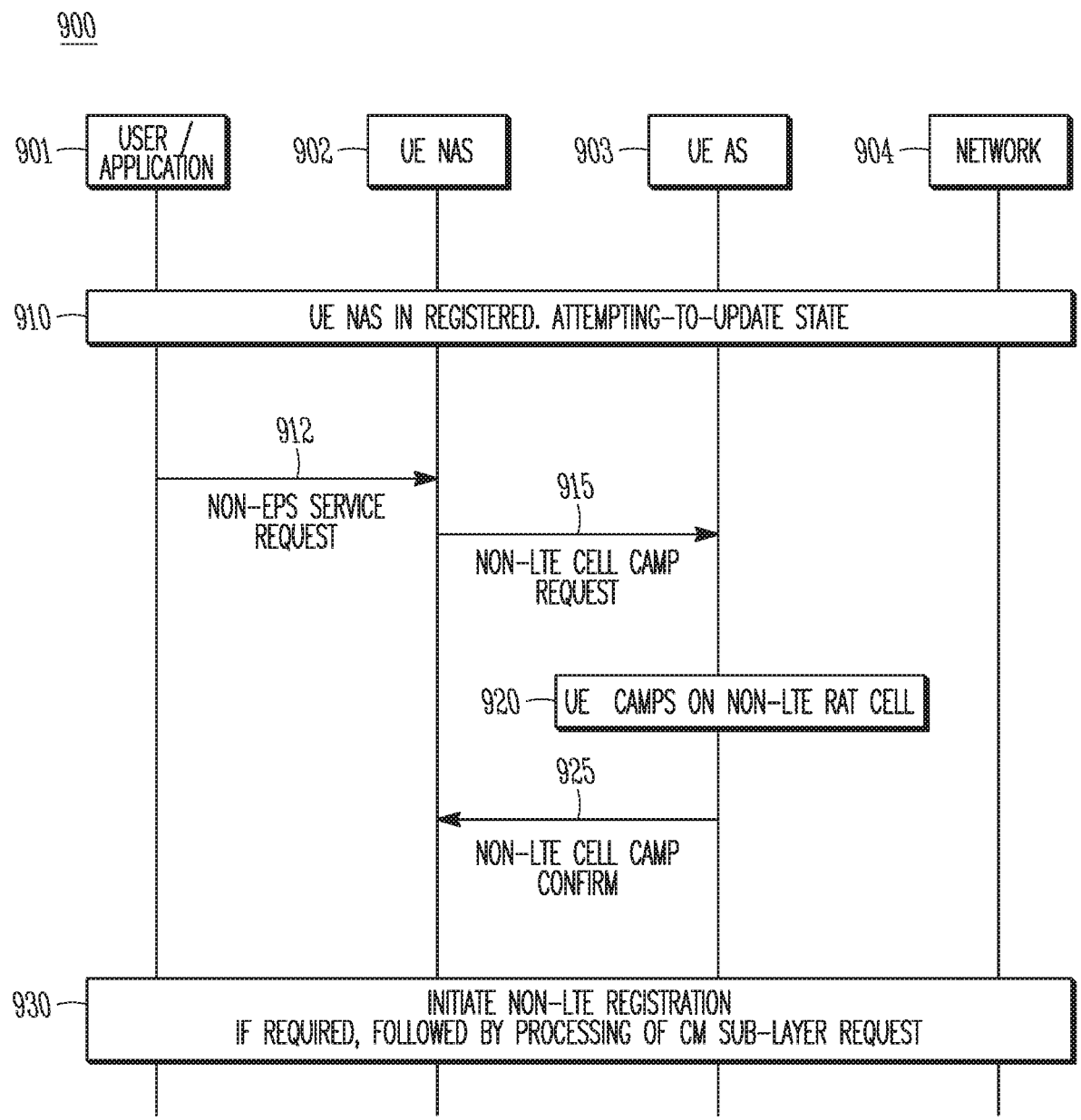
FIG. 9 illustrates another example of a network failure scenario in accordance with some embodiments.
Figure 10:
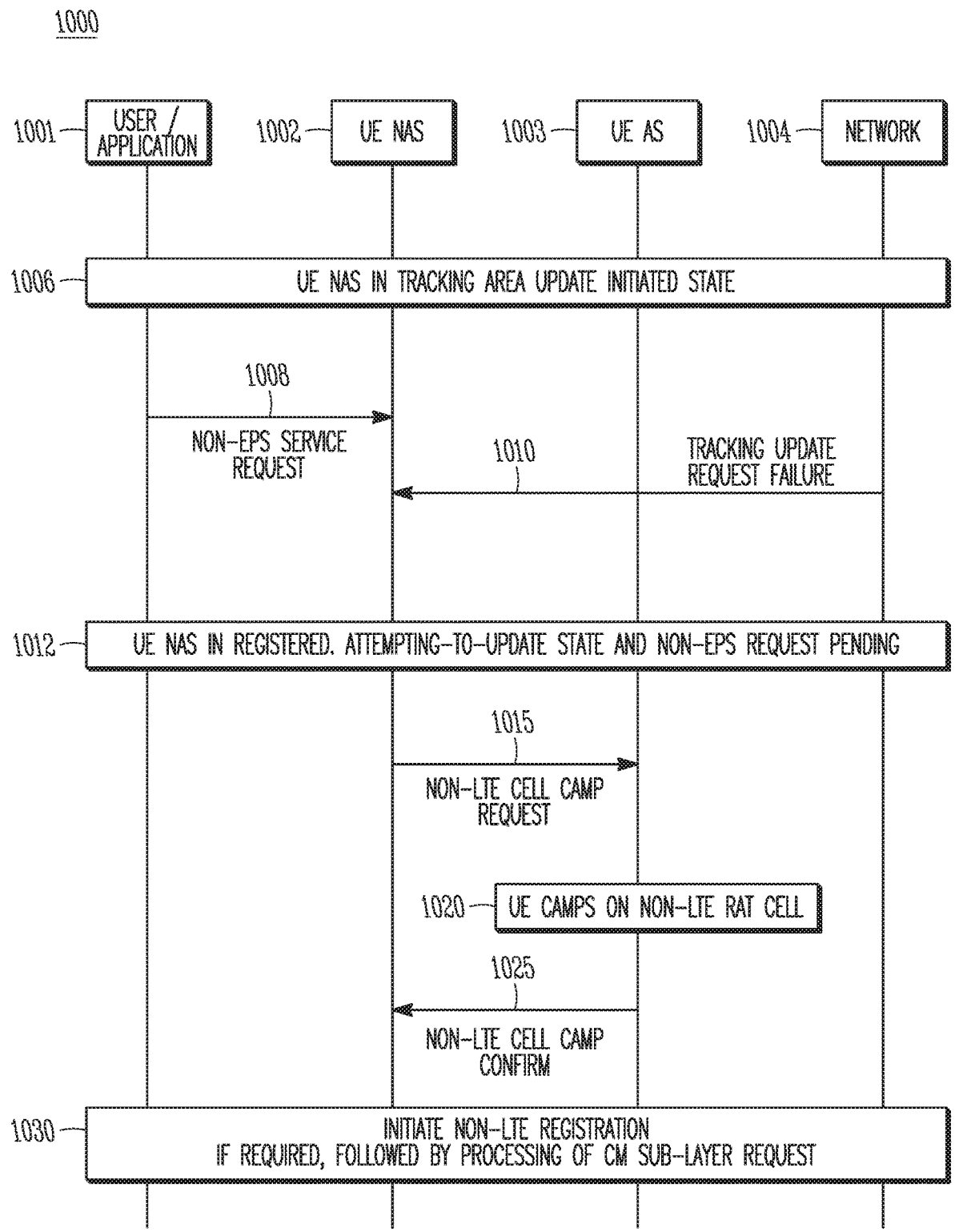
FIG. 10 illustrates another example of a network failure scenario in accordance with some embodiments.

FIG. 7 illustrates an example of a network failure scenario in accordance with some embodiments. FIG. 8 illustrates another example of a network failure scenario in accordance with some embodiments. FIG. 9 illustrates another example of a network failure scenario in accordance with some embodiments. FIG. 10 illustrates another example of a network failure scenario in accordance with some embodiments. It should be noted that the example scenarios illustrated in FIGS. 7-10 may illustrate some or all concepts and/or techniques described herein, but embodiments are not limited by these examples in terms of message types, parameters, states, components, chronological ordering of messages and/or other aspects. Some embodiments may include one or more operations and/or states from one or more of FIGS. 7-10. Some embodiments may include additional operations and/or states not shown in scenarios like those in FIGS. 7-10. Some embodiments may include similar operations and/or states shown in scenarios like those in FIGS. 7-10. Some embodiments may include operations and/or states different from those shown in scenarios like those in FIGS. 7-10. In addition, FIGS. 7-10 may illustrate techniques and/or operations using one or more particular failure states, such as REGISTERED.ATTEMPING-TO-UPDATE and/or DEREGISTERED.ATTEMPTING-TO-ATTACH, but such references are not limiting. In some embodiments, techniques and/or operations shown in FIGS. 7-10 may be used in accordance with other failure states, such as an "EMM-REGISTERED.ATTEMPTING-TO-UPDATE" state, an "EMM-DEREGISTERED.ATTEMPTING-TO-ATTACH" state and/or other failure state. Although not limited as such, the failure state may be included in a 3GPP standard and/or other standard. However, embodiments are not limited to usage of failure states that are included in a standard. The UE 102 may operate in the failure state for any suitable reason, including but not limited to temporary failures related to a network, registration, air interface and/or other aspect.

Referring to FIG. 7, the UE 102 may include a non-access stratum (NAS) 702 layer and/or module, an access stratum (AS) layer and/or module and a user/application 701 layer (which may include and/or be part of a connection management (CM) layer and/or module in some cases). In some embodiments, the UE 102 may include other modules and/or layers. In FIGS. 8-10, the UE 102 may include the same or similar modules and/or layers.

The example scenario 700 may illustrate events that may occur and/or operations that may be performed related to reception of a non-EPS service request from the CM sublayer by the UE 102 while the UE 102 operates in a DEREGISTERED.ATTEMPTING-TO-ATTACH state.

The example scenario 800 may illustrate events that may occur and/or operations that may be performed related to reception of a non-EPS service request from the CM sublayer by the UE 102 before the UE 102 moves to the DEREGISTERED.ATTEMPTING-TO-ATTACH state. Accordingly, the non-EPS service request may be pending when the UE 102 moves to the failure state.

The example scenario 900 may illustrate events that may occur and/or operations that may be performed related to reception of a non-EPS service request from the CM sublayer by the UE 102 while the UE 102 operates in a REGISTERED.ATTEMPTING-TO-UPDATE state.

The example scenario 1000 may illustrate events that may occur and/or operations that may be performed related to reception of a non-EPS service request from the CM sublayer by the UE 102 before the UE 102 moves to the REGISTERED.ATTEMPTING-TO-UPDATE state. Accordingly, the non-EPS service request may be pending when the UE 102 moves to the failure state.

In Example 1, an apparatus for a User Equipment (UE) may comprise transceiver circuitry. The apparatus may further comprise hardware processing circuitry. The hardware processing circuitry may configure the transceiver circuitry to transmit, as part of a packet-switched (PS) communication session, a data message to an Evolved. Node-B (eNB) of a PS network. The hardware processing circuitry may be configured to determine that a circuit-switched (CS) communication session with a CS network is to be established. The hardware processing circuitry may further configure the transceiver circuitry to, when the UE is operating in a failure state of the PS communication session, transmit a CS registration message to a CS base station of the CS network as part of an establishment of the CS communication session.

In Example 2, the subject matter of Example 1, wherein the UE may be arranged to operate as part of a Third Generation Partnership Project (3GPP) Long Term Evolution (LTE) network that supports the PS communication session.

In Example 3, the subject matter of one or any combination of Examples 1-2, wherein the hardware processing circuitry may further configure the transceiver circuitry to, when the UE is operating in the failure state, refrain from transmission of messages to the eNB for the establishment of the CS communication session.

In Example 4, the subject matter of one or any combination of Examples 1-3, wherein the hardware processing circuitry may further configure the transceiver circuitry to, when the UE is operating in a non-failure state for the PS communication session, transmit a combined attachment message to the PS base station. The combined attachment message may include status information for the PS communication session and may further include an indicator that the CS communication session is to be established.

In Example 5, the subject matter of one or any combination of Examples 1-4, wherein the hardware processing circuitry may be further configured to determine an availability of the CS network for the CS communication session based at least partly on a monitoring, at the UE, for transmissions by CS networks.

In Example 6, the subject matter of one or any combination of Examples 1-5, wherein the hardware processing circuitry may be further configured to determine, based at least partly on a network condition of the PS network, that the UE is to operate in the failure state for the PS communication session.

In Example 7, the subject matter of one or any combination of Examples 1-6, wherein the failure state may be one of a group that includes a first state in which the UE is de-registered from the PS network and intends to attach to the PS network, and further includes a second state in which the UE is registered with the PS network and intends to update information related to the PS communication session.

In Example 8, the subject matter of one or any combination of Examples 1-7, wherein the PS network may include a Third Generation Partnership Project (3GPP) Long Term Evolution (LTE) network. The first state may include an Evolved Packet System Mobility Management (EMM) DEREGISTERED.ATTEMPTING-TO-ATTACH state. The second state may include an EMM REGISTERED.ATTEMPTING-TO-UPDATE state.

In Example 9, the subject matter of one or any combination of Examples 1-8, wherein the determination that the CS communication session is to be established may be based at least partly on a service request generated, at the UE, by a connection management (CM) sub-layer of the UE.

In Example 10, the subject matter of one or any combination of Examples 1-9, wherein the PS communication session may include an Evolved Packet System (EPS) communication session and the CS communication session may include a non-EPS communication session.

In Example 11, the subject matter of one or any combination of Examples 1-10, wherein the hardware processing circuitry may include baseband circuitry to determine that the CS communication session is to be established.

In Example 12, a non-transitory computer-readable storage medium may store instructions for execution by one or more processors to perform operations for communication by a User Equipment (UE). The operations may configure the one or more processors to determine whether the UE is to operate in a failure state or a normal state for an active packet-switched (PS) communication session with an Evolved Node-B (eNB) of a PS network. The operations may further configure the one or more processors to configure the UE to, when the UE operates in the failure state, transmit a circuit-switched (CS) registration message to a CS base station for an establishment of a CS communication session and to further refrain from transmission of CS registration messages to the eNB. The operations may further configure the one or more processors to configure the UE to, when the UE operates in the normal state, transmit a combined attach message to the eNB that includes status information related to the PS communication session and further includes an indicator that the CS communication session is to be established.

In Example 13, the subject matter of Example 12, wherein the UE may be arranged to operate as part of a Third Generation Partnership Project (3GPP) Long Term Evolution (LTE) network that supports the PS communication session.

In Example 14, the subject matter of one or any combination of Examples 12-13, wherein the operations may further configure the one or more processors to configure the UE to detect a presence of the CS base station based at least partly on a monitoring, by the UE, for CS network signals. The CS registration message may be transmitted when the UE detects the presence of the CS base station.

In Example 15, the subject matter of one or any combination of Examples 12-14, wherein the determination of whether the UE is to operate in the failure state or the normal state for the PS communication session may be based at least partly on a network condition of the PS network.

In Example 16, the subject matter of one or any combination of Examples 12-15, wherein the operations may further configure the one or more processors to, when the UE operates in the failure state, initiate a failure state timer and refrain from resetting the failure state timer based on the transmission of the CS registration message.

In Example 17, the subject matter of one or any combination of Examples 12-16, wherein the failure state may be one of a group that includes a first state in which the UE is de-registered from the PS network and intends to attach to the PS network, and further includes a second state in which the UE is registered with the PS network and intends to update information related to the PS communication session.

In Example 18, the subject matter of one or any combination of Examples 12-17, wherein the PS network may include a Third Generation Partnership Project (3GPP) Long Term Evolution (LTE) network. The first state may include an Evolved Packet System Mobility Management (EMM) DEREGISTERED.ATTEMPTING-TO-ATTACH state. The second state may include an EMM REGISTERED.ATTEMPTING-TO-UPDATE state.

In Example 19, an apparatus for a User Equipment (UE) may comprise transceiver circuitry. The apparatus may further comprise hardware processing circuitry. The hardware processing circuitry may be configured to determine a network failure between the UE and a Long Term Evolution (LTE) network based at least partly on a failed registration attempt with the LTE network. The hardware processing circuitry may be further configured to transition, based on the determined network failure, to a failure state of operation for a re-registration with the LTE network. The hardware processing circuitry may be further configured to determine, while the UE operates in the failure state, that a circuit-switched (CS) connection is to be established and an availability of at least one CS base station to support the CS connection. The hardware processing circuitry may configure the transceiver circuitry to transmit, while the UE operates in the failure state and when it is determined that a group of one or more CS base stations is available, a registration message for the CS connection to at least one of the CS base stations in the group.

In Example 20, the subject matter of Example 19, wherein the hardware processing circuitry may further configure the transceiver circuitry to refrain from transmission to the eNB, while the UE operates in the failure state and when it is determined that the group of one or more CS base stations is available, of registration messages for the CS connection.

In Example 21, the subject matter of one or any combination of Examples 19-20, wherein the failure state may be one of a group that includes a first state in which the UE is de-registered from the LTE network and intends to register with the LTE network and further includes a second state in which the UE is registered with the LTE network and intends to update UE configuration information to the LTE network.

In Example 22, the subject matter of one or any combination of Examples 19-21, wherein the first state may include an Evolved Packet System Mobility Management (EMM) DEREGISTERED.ATTEMPTING-TO-ATTACH state. The second state may include an EMM REGISTERED.ATTEMPTING-TO-UPDATE state.

In Example 23, an apparatus for a User Equipment (UE), the apparatus comprises: means for determining whether the UE is to operate in a failure state or a normal state for an active packet-switched (PS) communication session with an Evolved Node-B (eNB) of a PS network; means for configuring the UE to, when the UE operates in the failure state, transmit a circuit-switched (CS) registration message to a CS base station for an establishment of a CS communication session and to fluffier refrain from transmission of CS registration messages to the eNB; and means for configuring the UE to, when the UE operates in the normal state, transmit a combined attach message to the eNB that includes status information related to the PS communication session and further includes an indicator that the CS communication session is to be established.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a user equipment (UE) configured for multi-mode operation in an Evolved Universal Terrestrial Radio Access Network (E-UTRAN), the apparatus comprising:

processing circuitry; and
memory coupled to the processing circuitry,
the processing circuitry configured to:
configure the UE to operate in an Evolved Packet System (EPS) Mobility Management (EMM) REGISTERED (EMM-REGISTERED) state when attached to an Evolved Packet Core Network (EPC);
configure the UE to operate in an EMM-DEREGISTERED state when unattached to the EPC;
initiate a combined attach procedure for the multi-mode operation when the UE is in the EMM-DEREGISTERED state to attempt to attach to the EPC, the combined attach procedure to attach to the EPC for both EPS and non-EPS services;
configure the UE to enter an EMM-DEREGISTERED.ATTEMPTING-TO-ATTACH state if the combined attach procedure has failed;
when the UE is in the EMM-DEREGISTERED.ATTEMPTING-TO-ATTACH state, the processing circuitry is to configure the UE to use requests for non-EPS services from a connection management (CM) layer of the UE to attempt to trigger the combined attach procedure, if mobility management backoff timer T3346 is not running or to attempt to select GSM/EDGE Radio Access Network (GERAN) or Universal Terrestrial Radio Access Network (UTRAN) radio-access technology (RAT) and proceed with the appropriate mobility management (MM) and call control (CC) specific procedures;
initiate a combined tracking area updating (TAU) procedure when the UE is in the EMM-REGISTERED state;
configure the UE to enter a EMM-REGISTERED.ATTEMPTING-TO-UPDATE state if the combined TAU procedure has failed;

when the UE is in the EMM-REGISTERED.ATTEMPTING-TO-UPDATE state, the processing circuitry is to configure the UE to use requests for non-EPS services from the CM layer to trigger the combined TAU procedure, if the mobility management backoff timer T3346 is not running, or to attempt to select the GERAN or the UTRAN radio access technology and proceed with the appropriate MM and CC specific procedures, wherein if the combined attach procedure is successful, the processing circuitry configures the UE for the multi-mode operation comprising packet-switched (PS) operation for the EPS services and circuit-switch (CS) operation for the non-EPS services; and wherein the memory is configured to store an indication of the UE's state.

2. The apparatus of claim 1, wherein when the UE is in the EMMDEREGISTERED state, the processing circuitry is configured to initiate an attach procedure or the combined attach procedure upon expiration of the timer T3346.

3. The apparatus of claim 2, wherein the processing circuitry is to configure the UE to enter the EMM-REGISTERED state when the attach procedure or the combined attached procedure is performed.

4. The apparatus of claim 1 wherein the processing circuitry is responsive to non-access stratum (NAS) signaling, from a NAS layer of the UE, to configure the UE for the EMM-REGISTERED state or the EMM-DEREGISTERED state, and to disable the E-UTRA capability of the UE when the UE is in the EMM-DEREGISTERED.ATTEMPTING-TO-ATTACH state if the combined attach procedure has failed and when the UE is in the EMM-REGISTERED.ATTEMPTING-TO-UPDATE state if the combined TAU procedure has failed.

5. The apparatus of claim 1 wherein when the UE is in the EMMDEREGISTERED.ATTEMPTING-TO-ATTACH state, the processing circuitry is to configure the UE to use requests for the non-EPS services from the CM layer to trigger the combined attach procedure if a T3346 timer is not running, or use requests for non-EPS services from the CM layer of the UE to attempt to select GSM/EDGE Radio Access Network (GERAN) or Universal Terrestrial Radio Access Network (UTRAN) radio-access technology (RAT) and disable Evolved Universal Terrestrial Radio Access (E-UTRA) capability.

6. The apparatus of claim 5 wherein when the UE is in the EMMREGISTERED.ATTEMPTING-TO-UPDATE state, the processing circuitry is to configure the UE to use requests for non-EPS services from the CM layer to trigger the combined tracking area updating procedure if the timer T3346 is not running, or to use requests for non-EPS services from the CM layer to attempt to select the GERAN or the UTRAN radio access technology and disable the E-UTRA capability.

7. The apparatus of claim 1 wherein the processing circuitry is to configure the UE for multi-mode operation, the multi-mode operation comprising a PS/CS mode.

8. The apparatus of claim 1 wherein the processing circuitry comprises a baseband processor.

9. The apparatus of claim 8 further comprising transceiver circuitry coupled to the baseband processor, the transceiver circuitry configured to be coupled to two or more antennas.

10. A non-transitory computer-readable storage medium that stores instructions for execution by processing circuitry a user equipment (UE) to configure the UE for multi-mode operation in an Evolved Universal Terrestrial Radio Access Network (E-UTRAN), the processing circuitry configured to:

configure the UE to operate in an Evolved Packet System (EPS) Mobility Management (EMM) REGISTERED (EMM-REGISTERED) state when attached to an Evolved Packet Core Network (EPC);

configure the UE to operate in an EMM-DEREGISTERED state when unattached to the EPC;

initiate a combined attach procedure when the UE is in the EMM-DEREGISTERED state to attempt to attach to the EPC, the combined attach procedure to attach for both EPS and non-EPS services;

configure the UE to enter an EMM-DEREGISTERED.ATTEMPTING-TO-ATTACH state if the combined attach procedure has failed;

when the UE is in the EMM-DEREGISTERED.ATTEMPTING-TO-ATTACH state, the processing circuitry is to configure the UE to use requests for non-EPS services from a connection management (CM) layer of the UE to attempt to trigger the combined attach procedure, if mobility management backoff timer T3346 is not running or to attempt to select GSM/EDGE Radio Access Network (GERAN) or Universal Terrestrial Radio Access Network (UTRAN) radio-access technology (RAT) and proceed with the appropriate mobility management (MM) and call control (CC) specific procedures;

initiate a combined tracking area updating (TAU) procedure when the UE is in the EMMREGISTERED state;

configure the UE to enter an EMM-REGISTERED.ATTEMPTING-TO-UPDATE state if the combined TAU procedure has failed;

when the UE is in the EMM-REGISTERED.ATTEMPTING-TO-UPDATE state, the processing circuitry is to configure the UE to use requests for non-EPS services from the CM layer to trigger the combined TAU procedure, if the mobility management backoff timer T3346 is not running, or to attempt to select the GERAN or the UTRAN radio access technology and proceed with the appropriate MM and CC specific procedures, wherein if the combined attach procedure is successful, the processing circuitry configures the UE for the multi-mode operation comprising packet-switched (PS) operation for the EPS services and circuit-switch (CS) operation for the non-EPS services; and wherein the processing circuitry configures an indication of the UE's state to be stored in memory.

11. The computer-readable storage medium of claim 10, wherein when the UE is in the EMM-DEREGISTERED state, the processing circuitry is configured to initiate an attach procedure or the combined attach procedure upon expiration of the timer T3346.

12. The computer-readable storage medium of claim 11, wherein the processing circuitry is to configure the UE to enter the EMM-REGISTERED state when the attach procedure or the combined attached procedure is performed.

13. The computer-readable storage medium of claim 10 wherein the processing circuitry is responsive to non-access stratum (NAS) signaling, from a NAS layer of the UE, to configure the UE for the EMM-REGISTERED state or the EMM-DEREGISTERED state, and to disable the E-UTRA capability of the UE when the UE is in the EMMDEREG-ISTERED.ATTEMPTING-TO-ATTACH state if the combined attach procedure has failed and when the UE is in the EMM-REGISTERED.ATTEMPTING-TOUPDATE state if the combined TAU procedure has failed.

* * * * *